United States Patent [19]

Sekido et al.

[11] 4,040,766
[45] Aug. 9, 1977

[54] GATE PROTECTING DEVICE FOR HYDRAULIC MACHINES

[75] Inventors: Kenzi Sekido; Tsugio Yoshikawa, both of Hitachi, Japan

[73] Assignee: Hitachi, Ltd., Tokyo, Japan

[21] Appl. No.: 658,680

[22] Filed: Feb. 17, 1976

[30] Foreign Application Priority Data

Feb. 14, 1975 Japan .................................. 50-17810

[51] Int. Cl.² ............................................. B23B 39/04
[52] U.S. Cl. ..................................... 415/9; 64/28 R; 415/36; 415/155
[58] Field of Search ................. 64/28; 415/9, 36, 148, 415/155, 159

[56] References Cited

U.S. PATENT DOCUMENTS

| | | | |
|---|---|---|---|
| 1,517,896 | 12/1924 | Erz .......................................... | 415/9 |
| 1,585,862 | 5/1926 | Jessop ..................................... | 415/9 |
| 1,641,755 | 9/1927 | Gross et al. ............................. | 415/9 |
| 1,725,421 | 8/1929 | Rogers .................................... | 415/9 |
| 3,060,706 | 10/1962 | Hess ........................................ | 64/28 |
| 3,639,072 | 2/1972 | Munkstrand ............................ | 419/9 |

*Primary Examiner*—Samuel Scott
*Assistant Examiner*—Randall Heald
*Attorney, Agent, or Firm*—Beall & Jeffery

[57] ABSTRACT

In a wicket gate protecting device for hydraulic machines, a pair of link plates transmitting a force between a gate control ring and a gate lever, is connected to the gate lever through a shear pin. The gate lever disposed between the link plates, and rotatably supported about the shear pin. When the movement of the wicket gate is restricted by obstacles entered between adjacent gate vanes, the shear pin is cut and a part of the shear pin supporting the gate lever moves along between the link plates for a distance and is stopped by friction between the link plates and the shear pin, thereby preventing damage to the neighboring gate vanes.

12 Claims, 11 Drawing Figures

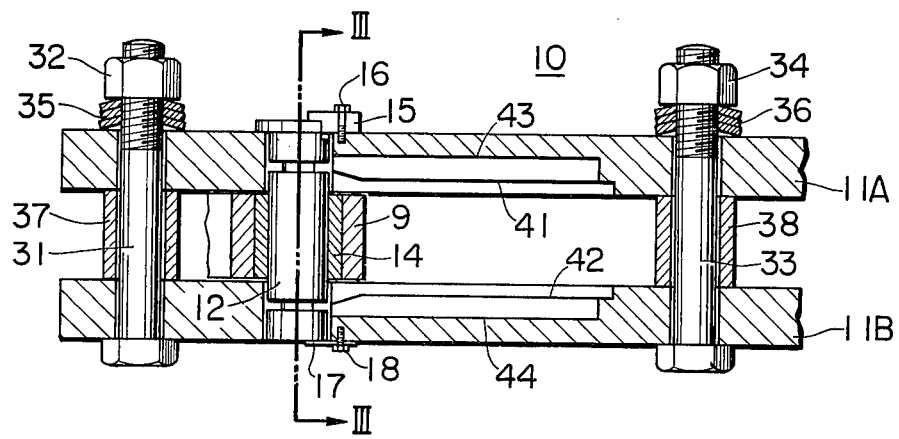
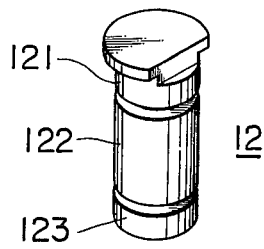
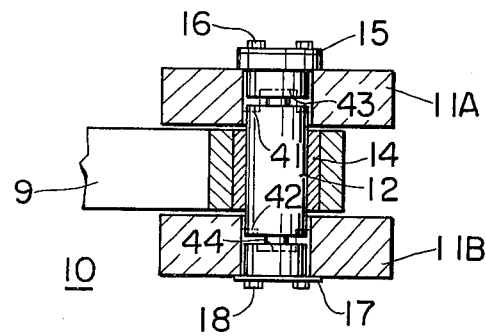
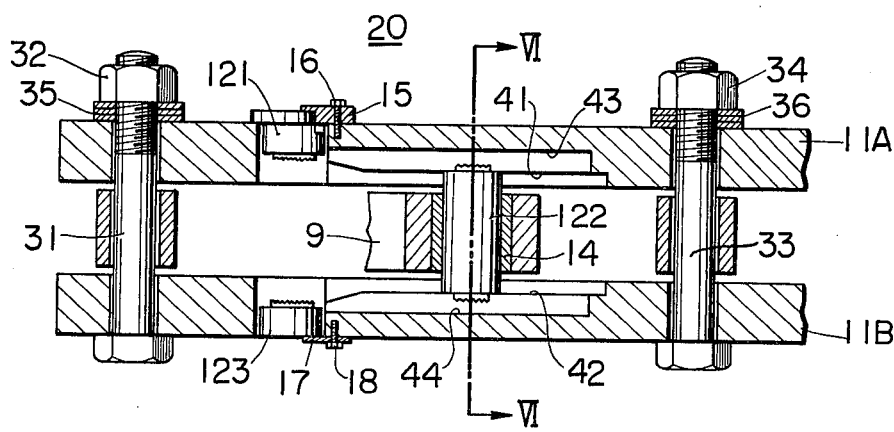
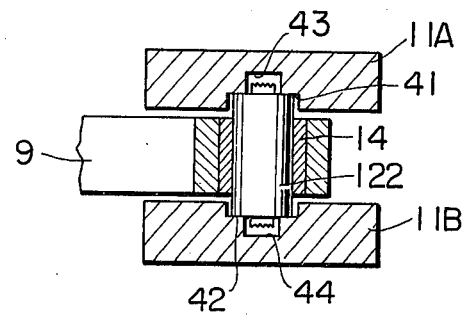

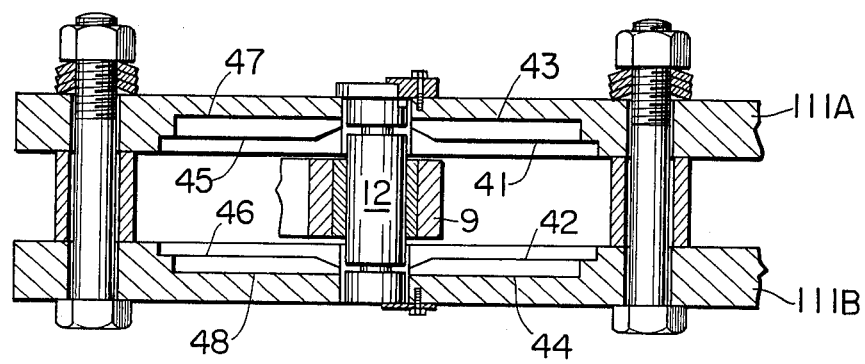
FIG. 7
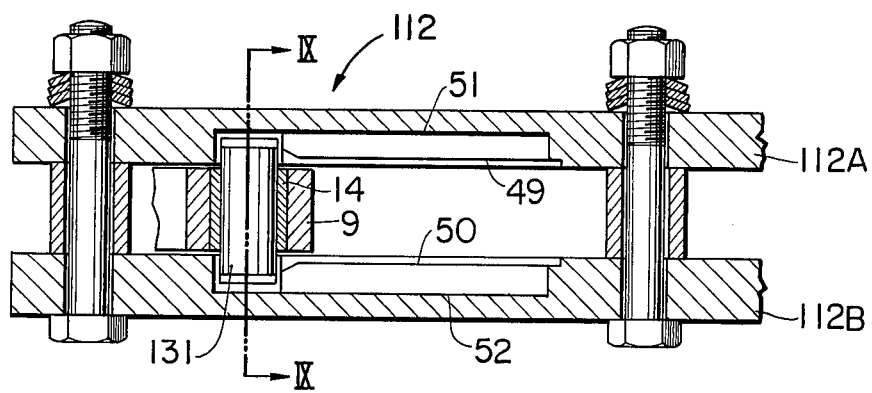
FIG. 8
FIG. 9
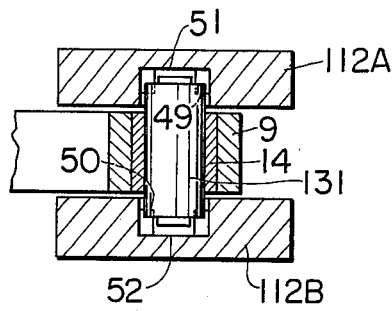
FIG. 11
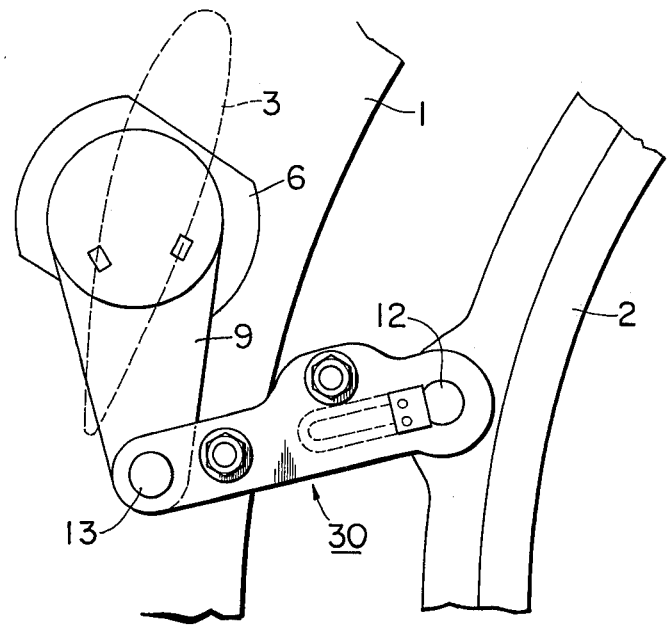
FIG. 10
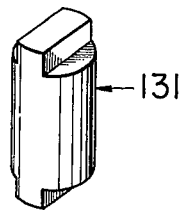

4,040,766

GATE PROTECTING DEVICE FOR HYDRAULIC MACHINES

BACKGROUND OF THE INVENTION

The present invention relates to a gate protecting device for hydraulic machines to avoid destruction of control linkage of gates.

In hydraulic machines, where a series of wicket gates are provided around an impeller runner to control and guide water flow through the runner, it is desirable to employ a gate protecting device between wicket gates and a gate control ring to avoid destruction of the gate control ring when a gate's movement is restricted by an obstruction struck between adjacent gate vanes or between a gate vane and a stationary vane arranged around the gate vanes.

Exemplary of the prior art is U.S. Pat. No. 3,060,706 to P.D. Hess wherein a shear lever transmitting force between a gate control ring and a gate lever is secured by a shear pin and when the shear pin is severed, relative movements between the shear lever and the gate lever are frictionally retarded.

SUMMARY OF THE INVENTION

Accordingly, one object of the present invention is to provide an improved gate protecting device which has reliable function to prevent destruction of gates or a control ring.

Another object of the present invention is to provide an improved gate protecting device which has a simple construction compared with conventional ones.

Briefly stated, the invention comprises the improvement in a gate protecting device having a lever means rotatably supported through a connecting pin between a pair of link members. When a force transmitted between the lever means and link members has reached a predetermined amount, a relative movement of the lever means along the link members is retarded by friction between the link members and the connecting pin.

BRIEF DESCRIPTION OF THE DRAWINGS

FIG. 2 is a vertical section view of the gate protecting device taken along the line II—II of FIG. 1.

FIG. 3 is a vertical section view taken along the line III—III of FIG. 2.

FIG. 4 is a perspective view of a shear pin in FIG. 1, 2 and 3. FIG. 5 is a vertical section view of the gate protecting device taken along the line V—V of FIG. 1.

FIG. 6 is a vertical section view taken along the line VI—VI of FIG. 5.

FIG. 7 is a vertical section view of the gate protecting device of another embodiment of the present invention.

FIG. 8 is a vertical section view of the gate protecting device of still another embodiment of the present invention.

FIG. 9 is a vertical section view taken along the line IX—IX of FIG. 8.

FIG. 10 is a perspective view of a connecting pin in FIG. 8 and 9.

FIG. 11 is a schematic drawing of a gate, a gate control ring and a gate protecting device of still further embodiment of the present invention.

DESCRIPTION OF THE PREFERRED EMBODIMENT

Figure 1:
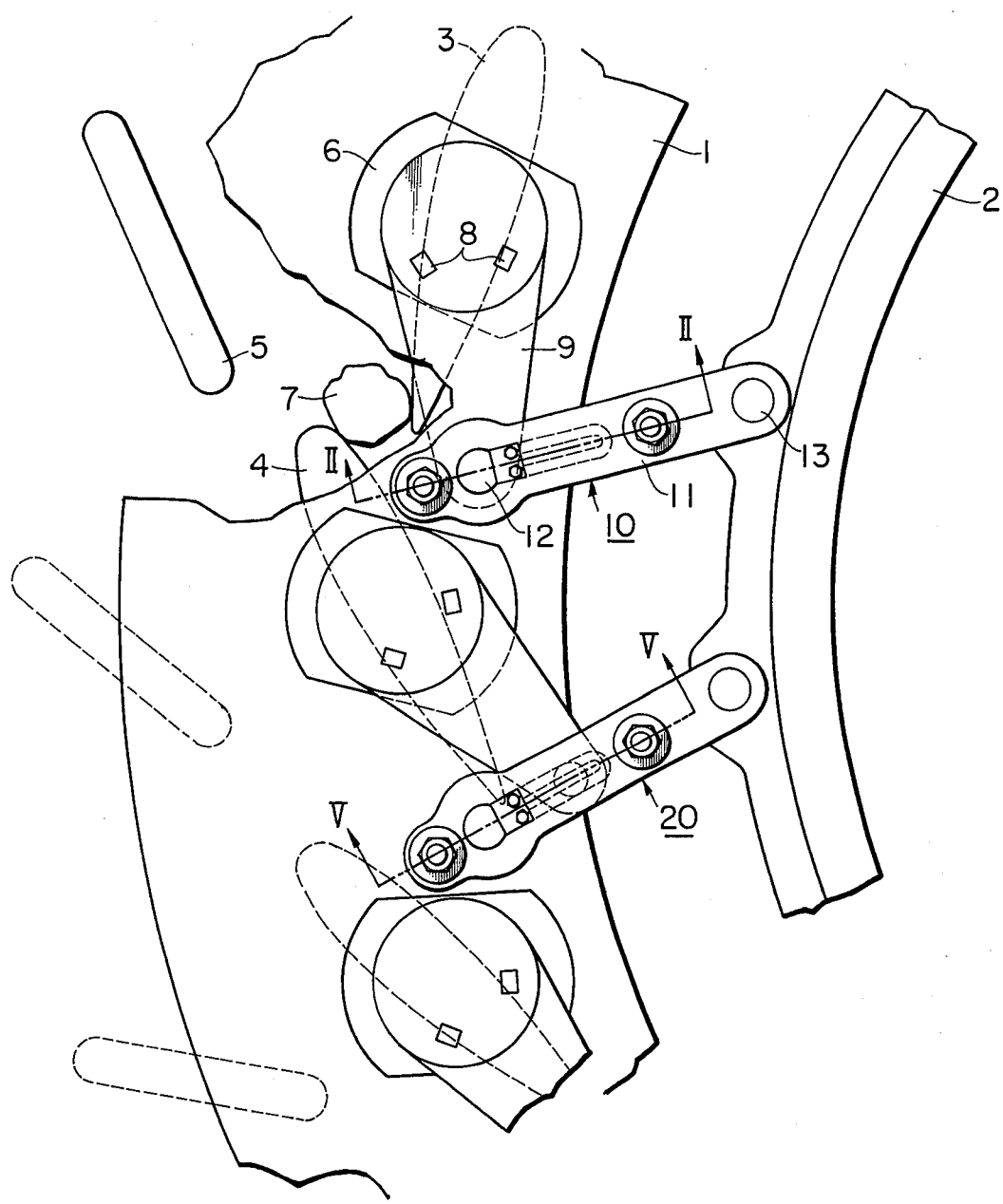
FIG. 1 is schematic drawing, partially broken, of wicket gates, a gate control ring and gate protecting device of the present invention.

Referring to FIG. 1 of the drawing, a gate vane 3 arranged around a runner (not shown) is coupled to a shaft 6 under an upper cover 1 within a turbine housing. A gate lever 9 is coupled at the top of the shaft 6 by keys 8 above the upper cover 1. A link member 10, which transmits a gate control force from a control ring 2 to the gate lever 9, is linked with the gate lever 9 and the control ring 2 respectively through pins 12 and 13. This structure is repeated around the runner, for example with the adjacent vane 4 having link member 20.

When an obstruction 7 enters in turbine housing, the obstruction 7 may be at times caught between adjacent gate vanes (as shown) or between a gate vane and a stational vane 5, and disturb the movement of the gate vane 4. When the force transmitted between the gate vane 4 and the control ring 2 exceeds a predetermined amount due to the obstruction 7, the pin connecting the gate lever and the link member 20 moves relatively along the link member 20 to release the gate lever from the link member 20. The relative movement of the gate lever which is released from the link member 20 is braked by a braking mechanism of the link member 20.

FIGS. 2, 3 and 4 explain further details of the braking mechanism of the link member. The braking mechanism of the link member 10 includes a pair of link plates 11A and 11B which are facing each other with a distance and secured by bolts 31 and 33 and nuts 32 and 34 through springs 35 and 36. The distance between the link members 11A and 11B is adjusted by sleeves 37 and 38 provided around the bolts 31 and 33.

The pin 12 comprises a shear pin, as illustrated in FIG. 4, which has two weakend portions for to separate into three parts 121, 122 and 123 when the force transmitted to the pin 12 exceeds a predetermined amount. The gate lever 9 is rotatably supported about an axis of the pin 12 through a bushing 14. The shear pin 12 is supported in holes provided on the link plates 11A and 11B. The link plates 11A and 11B have grooves 41, 42, 43 and 44 therealong on opposite sides facing each other. The grooves 43 and 44 are narrower and deeper than the grooves 41 and 42. The grooves 41, 42, 43 and 44 extend from the holes for a short distance along the link plates 11A and 11B. The beginning portion of the grooves 41, 42 are tapered to enable the shear pin 12 to easily run on the grooves.

The braking mechanism of the link members may further include stoppers 15 and 17 which are mounted on the link plates 11A and 11B by bolts 16 and 18 at the top and bottom of the shear pin 12 so that the shear pin 12 may not rotate and fall out of the holes.

In normal operating condition, the relative movement between the gate lever 9 and the link member 10 is restricted except for a relative rotation about an axis of the shear pin 12.

When the force transmitted to the shear pin exceeds the predetermined amount due to, for example as illustrated in FIG. 1, the disturbance of the movement of the gate vane 4 by an obstruction 7, the shear pin of the link member 20 is broken by the force transmitted thereto.

Referring to FIG. 5 and 6, in which the link member 20 is shown in details. The shear pin 12 is broken to separate into three parts 121, 122 and 123. The middle part 122 of the broken shear pin 12 (thereafter shear pin 122) supporting the gate lever 9 runs on the grooves 41 and 42 against the friction force between the shear pin 122 and the grooves 41, 42. The friction force is generated by the springs 35 and 36 which is adjusted beforehand to brake the relative movement of the shear pin 122 so that the movement of the shear pin 122 is stopped after traveling a short distance along on the grooves 41 and 42.

As best illustrated in FIG. 2 and 5, dished disc springs are preferable for the springs 35 and 36 to obtain a large spring force with a little deformation of the spring.

In this embodiment, when the shear pin connecting one of the gate vanes is broken due to the obstruction, even if the troubled gate vane is released from the control ring, the normal operation of other gate vanes can be obtained without applying any excess force on the control ring.

Further, in this embodiment, as the braking mechanism is provided to the link members, a large moment arm is obtained, that is the length between the axis of the gate shaft and the shear pin. Accordingly, a large braking torque of the gate vanes can be obtained with a small friction force of the braking mechanism and the construction of the braking mechanism becomes simple as compared with conventional ones.

In the further embodiments illustrated, like numerals have been provided for like parts.

In accordance with the invention, the grooves may be provided on either side of the shear pin as illustrated in FIG. 7. The shear pin 12 is disposed through the link plates 111A and 111B, and the grooves 45, 46 47 and 48 extend to another direction of the grooves 41, 42, 43 and 44 along the link plates 111A and 111B so that the relative movement of the troubled gate may be braked by the braking mechanism either when the gate is moving in the closing direction or opening direction.

Referring to FIG. 8, 9 and 10. Although the braking mechanism of the link members is of similar construction as described above, a connecting pin 131 without weakened portions is employed in place of the shear pin 12. The connecting pin 131 is pivotally disposed between the link plates 112A and 112B. When the force transmitted between the gate lever 9 and the link member 112 exceeds a predetermined amount, the connecting pin 131 with the gate lever 9 runs on the grooves 49 and 50, and after traveling in the grooves 49 and 50 for a short distance, the movement of the connecting pin 131 is stopped by friction caused between the grooves 49 and 50 and the connecting pin 131. The relative rotation of the connecting pin 131 is restricted by the grooves 51 and 52. According to this embodiment, an exchange of the broken shear pin can be avoided.

In aforementioned explanations, the braking mechanism is only employed for the connecting part of the gate lever and the link members. However, it should be noted that, as illustrated in FIG. 11, the braking mechanism can be employed for the connecting part of the link members and the control ring. The shear pin 12 in FIG. 2 or the connecting pin in FIG. 8 is employed for connecting the control ring 2 and the link member 30. Construction of the link member 30 are substantially similar to that shown in FIG. 1, 2, 7 and 8.

While several preferred embodments of the present invention have been set forth along with specific examples for purposes of illustration, further embodiments, variations and modifications are contemplated according to the broader aspects of the present invention, all as determined by the spirit and scope of the following claims.

What is claimed is:

1. A gate protecting device for hydraulic machines having a plurality of movable gate vanes having their position controlled by a movable control member, comprising: a plurality of link means for transferring a control force from the control member to corresponding ones of the gate vanes and each having a pair of spaced apart link members facing each other and mounted for movement toward and away from each other; a plurality of lever means for driving the gate vanes and being disposed between corresponding pairs of said link members; spring means biasing said link members towards each other to decrease the distance between said link members; connecting means normally pivotally connecting said link members to said lever means and to the control member; when the control force transmitted between one of said lever means and the control member exceeds a predetermined amount, said connecting means providing relative translation of one of said one lever means and the control member with respect to said link members; and friction means between said link members and said connecting means braking the relative translation, and including means moving said link members apart during translation against the bias of said spring means causing a frictional force resisting relative translation.

2. A gate protective device as defined in claim 1, wherein said friction means includes grooves provided on each of said link members facing each other, and a pivot pin that is a part of said connecting means and that moves in contact with and along said grooves upon the relative translation, when the control force transmitted between said one lever means and the control member exceeds the predetermined amount, to brake by friction between said pin and said grooves.

3. A gate protecting device as defined in claim 2, wherein said pivot pin is a shear pin with a weakened portion for breakage when the control force has reached the predetermined amount, so that the pin broken at the weakened portion translates along said grooves with said one of said one lever means and the control member.

4. A gate protecting device as defined in claim 3, wherein said link members have opposed holes through said grooves receiving said shear pin, and the transition from said holes to said grooves is tapered to provide wedge means cooperating with the translating pivot pin for moving said link members apart against the bias of said spring means as said pivot pin moves from said holes to said grooves as the predetermined control force is exceeded.

5. A gate protecting device as defined in claim 2, wherein opposite terminal ends of said pivot pin are respectively normally pivotally supported on said link members and translate with said pivot pin when control force exceeds the predetermined amounts, and said grooves normally extend from said pivot pin along said link members generally perpendicular to the pivot axis of said pivot pin.

6. A gate protecting device as defined in claim 5, wherein said link members have aligned recesses normally receiving the opposite terminal ends of said pivot pin, and the transition from said holes to said grooves is tapered to provide wedge means cooperating with the translating pivot pin for moving said link members apart against the bias of said spring means as said pivot pin moves from said holes to said grooves as the predetermined control force is exceeded.

7. A gate protecting device as defined in claim 2, wherein opposite portions of said pivot pin are respectively normally pivotably supported in holes provided on respective link members and separated from a central portion by weaker shear portions that will break when the control force exceeds said predetermined amount, and including means positively retaining the broken end portions in said holes as the broken central portion translates within said grooves.

8. A gate protecting device as defined in claim 7, wherein the transition from said holes to said grooves is tapered to provide wedge means cooperating with the translating pivot pin for moving said link members apart against the bias of said spring means as said pivot pin moves from said holes to said grooves as the predetermined control force is exceeded.

9. A gate protecting device as defined in claim 2, wherein said link members have aligned recesses normally receiving the opposite terminal ends of said pivot pin, and the transition from said holes to said grooves is tapered to provide wedge means cooperating with the translating pivot pin for moving said link members apart against the bias of said spring means as said pivot pin moves from said holes to said grooves as the predetermined control force is exceeded.

10. A gate protecting device as defined in claim 2, wherein said grooves normally extend in opposite directions from said pivot pin on each link member to provide protection during both opening and closing of the gate vanes.

11. A gate protecting device for hydraulic machines having a plurality of movable gate vanes having their position controlled by a movable control member, comprising: a plurality of lever means for respectively driving the gate vanes for changing their positions; a plurality of link means for transferring a control force from the control member to corresponding ones of said lever means, each of said link means having a pair of spaced apart link members on opposite sides of a corresponding one of said lever means and control member, and being mounted for substantial movement away from each other; spring means biasing said link members towards each other to decrease the distance between said link members and resist said movement away from each other; connecting means normally pivotally connecting said link members to said lever means and to the control member; when the control force transmitted between one of said lever means and the control member exceeds a predetermined amount, said connecting means providing relative translation of the pivotal connection of one of said one lever means and the contol member toward the other pivotal connection and with respect to said link members; and friction means between said link members and said one pivotal connection for wedging said link members away from each other against the bias of said spring means to brake the relative translation.

12. A gate protecting device as defined in claim 11, wherein said friction means includes grooves provided on each of said link members, and a pivot pin that is a part of said connection means of one pivotal connection and that moves along said grooves upon the relative translation, when the control force transmitted between said one lever means and the control member exceeds the predetermined amount, to brake by friction between said pin and said grooves.

* * * * *